United States Patent [19]

Shows

[11] 4,145,169

[45] Mar. 20, 1979

[54] RECORD DISC DEWARPING DEVICE

[76] Inventor: William H. Shows, Box 646, Laurel, Miss. 39440

[21] Appl. No.: 900,985

[22] Filed: Apr. 28, 1978

[51] Int. Cl.² ............................................. B29C 15/00
[52] U.S. Cl. ...................................... 425/11; 425/446; 425/810; 425/384
[58] Field of Search ................. 425/11, 384, 810, 445, 425/446; 264/36, 230, 320, 340, 107

[56] References Cited

U.S. PATENT DOCUMENTS

| | | | |
|---|---|---|---|
| 2,388,127 | 10/1945 | Downing | 425/11 X |
| 2,578,457 | 12/1951 | Somers | 425/11 X |
| 4,018,552 | 4/1977 | Prast et al. | 425/810 |

Primary Examiner—Robert L. Spicer, Jr.
Attorney, Agent, or Firm—Daniel Jay Tick

[57] ABSTRACT

A record disc dewarping device presses the disc between planar members and applies heat while pressing the disc.

1 Claim, 4 Drawing Figures

RECORD DISC DEWARPING DEVICE

BACKGROUND OF THE INVENTION

The present invention relates to a record disc dewarping device. More particularly, the invention relates to a record disc dewarping device for a record disc having a pair of spaced opposite normally planar normally parallel surfaces having spiral grooves formed therein corresponding to audio frequencies recorded therein.

Record disc dewarping devices are disclosed in the following United States patents. U.S. Pat. No. 2,495,556, issued Jan. 24, 1950 to Waid, U.S. Pat. No. 2,559,539, issued July 3, 1951 to Kelly, U.S. Pat. No. 2,563,701, issued Aug. 7, 1951 to Ajero, U.S. Pat. No. 2,578,457, issued Dec. 11, 1951 to Somers, U.S. Pat. No. 2,615,197, issued Oct. 28, 1952 to Somers and U.S. Pat. No. 2,663,050, issued Dec. 22, 1953 to Helm, Jr.

Objects of the invention are to provide a record disc dewarping device of simple structure, which is inexpensive in manufacture, used with facility, convenience and safety, and functions efficiently, effectively and reliably to dewarp a record disc so that sound reproduction therefrom is of excellent fidelity.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 3:
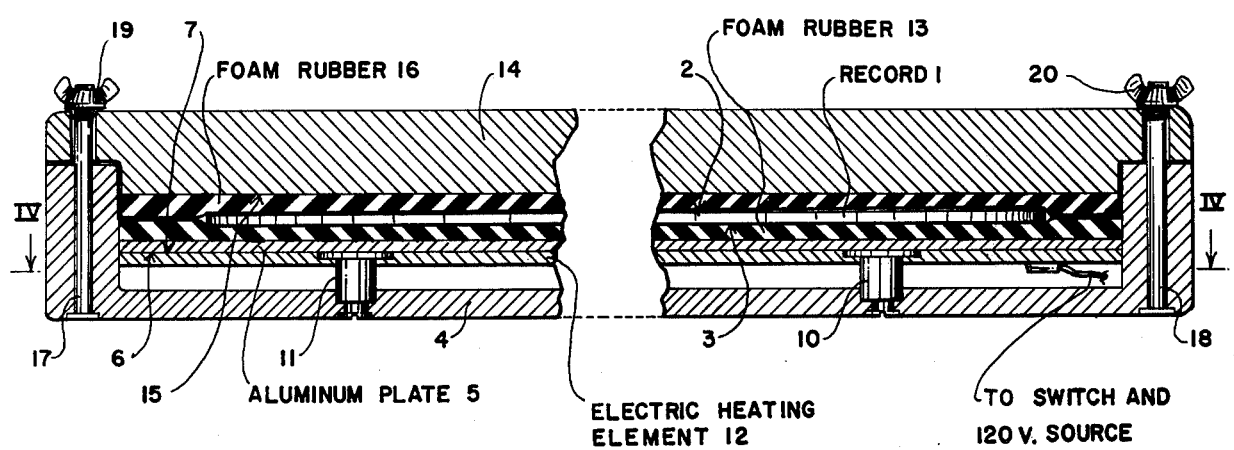
FIG. 3 is a cross-sectional view, on an enlarged scale, of the embodiment of FIG. 1.

The record disc dewarping device of the invention is for a record disc 1 having a pair of spaced opposite normally planar, normally parallel surfaces 2 and 3, as shown in FIG. 3. The record disc 1 has substantially spiral grooves formed in the parallel surfaces thereof, corresponding to audio frequencies recorded therein, in the usual manner of record discs.

Figure 4:
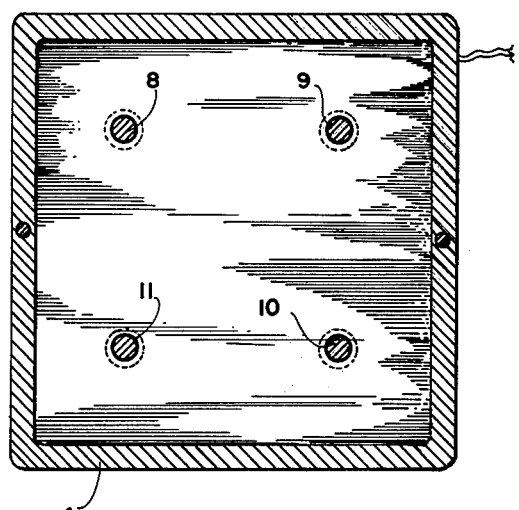
FIG. 4 is a cross-sectional view, taken along the lines IV—IV, of FIG. 3.

The record disc dewarping device of the invention comprises a bottom member 4 of substantially block-like configuration having an aluminum plate 5 with spaced parallel first and second planar surfaces 6 and 7, respectively, as shown in FIG. 3. The aluminum plate 5 is supported on the bottom member 4 in spaced relation therewith via a plurality of spaced nubs 8, 9, 10 and 11 (FIG. 4). An electric heating element 12 is provided on the bottom member 4 interposed between said bottom member and the first surface 6 of the aluminum plate 5 for heating the second surface 7 of said plate.

Figure 1:
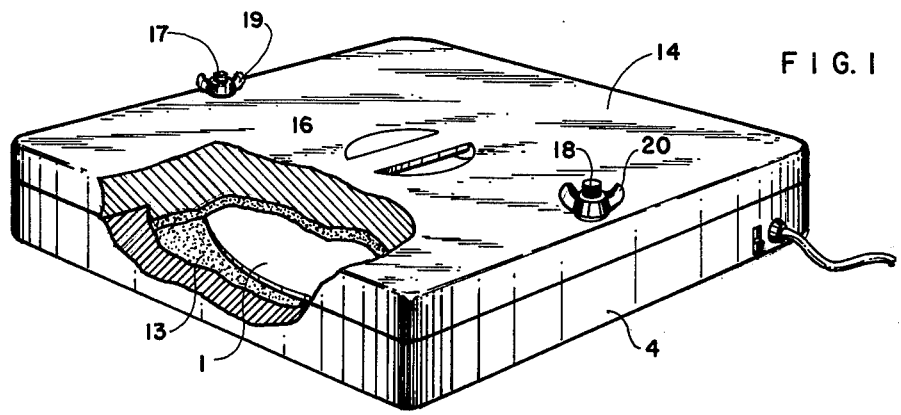
FIG. 1 is a perspective view, partly cutaway, and partly in section, of an embodiment of the record disc dewarping device of the invention.
Figure 2:
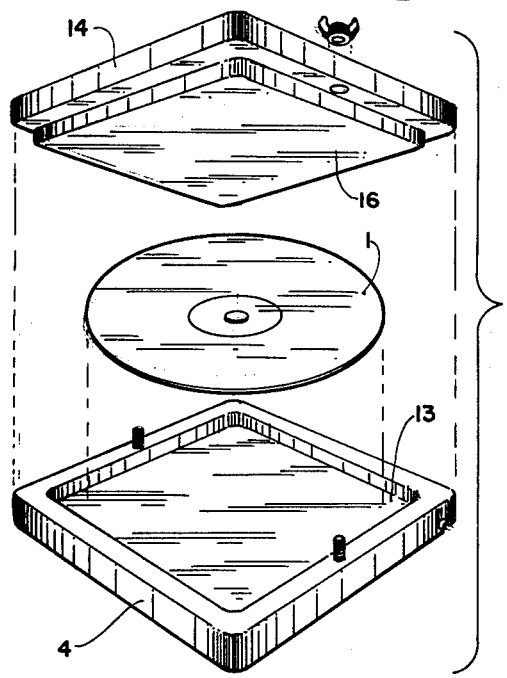
FIG. 2 is an exploded perspective view, on a reduced scale, of the embodiment of FIG. 1.

A first layer of foam rubber 13 is provided on the second surface 7 of the aluminum plate 5, as shown in FIGS. 1 to 3.

A top member 14 of substantially block-like configuration (FIGS. 1 to 3) has a planar surface 15, as shown in FIG. 3. A second layer of foam rubber 16 is provided on the planar surface 15 of the top member 14, as shown in FIGS. 1 to 3.

Clamping devices, comprising a pair of bolts 17 and 18 and corresponding threadedly coupled wing nuts 19 and 20, respectively, releasably clamp the bottom and top members 4 and 14, respectively, to each other with the first and second layers of foam rubber 13 and 16 in juxtaposition, as shown in FIGS. 1 and 3.

When a record disc 1 is positioned and pressed between the layers of foam rubber 13 and 16, and the heating element 12 is energized for a predetermined period of time, the record disc is dewarped upon cooling.

In brief, the method of the invention for dewarping a record disc comprises the steps of pressing the surfaces of the record disc toward each other, heating the record disc during the pressing thereof and cooling said record disc after heating thereof.

While the invention has been described by means of a specific example and in a specific embodiment, I do not wish to be limited thereto, for obvious modifications will occur to those skilled in the art without departing from the spirit and scope of the invention.

I claim:

1. A record disc dewarping device for a record disc having a pair of spaced opposite normally planar normally parallel surfaces having substantially spiral grooves formed therein corresponding to audio frequencies recorded therein, said record disc dewarping device comprising a bottom member of substantially block-like configuration having an aluminum plate with spaced parallel first and second planar surfaces, said plate being supported on said bottom member in spaced relation therewith;

an electric heating element on the bottom member interposed between said bottom member and the first surface of said plate for heating the second surface of said plate;

a first layer of foam rubber on the second surface of said plate;

a top member of substantially block-like configuration having a planar surface;

a second layer of foam rubber on the planar surface of the top member; and clamping means for releasably clamping the bottom and top members to each other with the first and second layers of foam rubber in juxtaposition whereby when a record disc is positioned and pressed between said layers of foam rubber and the heating element is energized for a predetermined period of time the record disc is dewarped upon cooling.

* * * * *